(12) United States Patent
Matsuzawa et al.

(10) Patent No.: US 9,348,424 B2
(45) Date of Patent: May 24, 2016

(54) INPUT DEVICE, INPUT METHOD, AND COMPUTER PROGRAM FOR INPUTTING CHARACTERS, NUMBERS, OR SYMBOLS BY USING AN ON-SCREEN KEYBOARD

(71) Applicant: SONY COMPUTER ENTERTAINMENT INC., Tokyo (JP)

(72) Inventors: Takeshi Matsuzawa, Tokyo (JP); Takashi Amada, Tokyo (JP); Ryota Uchino, Tokyo (JP); Yasuhiro Yamanaka, Chiba (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 316 days.

(21) Appl. No.: 13/942,793

(22) Filed: Jul. 16, 2013

(65) Prior Publication Data

US 2013/0300669 A1 Nov. 14, 2013

Related U.S. Application Data

(63) Continuation of application No. PCT/JP2011/006722, filed on Nov. 30, 2011.

(30) Foreign Application Priority Data

Jan. 25, 2011 (JP) .................. 2011-013353

(51) Int. Cl.
*G06F 3/02* (2006.01)
*G06F 3/041* (2006.01)
*G06F 3/023* (2006.01)
*G06F 3/0488* (2013.01)

(52) U.S. Cl.
CPC ............... *G06F 3/02* (2013.01); *G06F 3/0237* (2013.01); *G06F 3/0238* (2013.01); *G06F 3/04886* (2013.01)

(58) Field of Classification Search
CPC ... G06F 3/04883; G06F 3/04886; G06F 3/02; G06F 3/0238; G06F 3/0237

USPC .................................................. 345/168–179
See application file for complete search history.

(56) References Cited

U.S. PATENT DOCUMENTS

2008/0082934 A1* 4/2008 Kocienda et al. ............. 715/773
2008/0259039 A1* 10/2008 Kocienda et al. ............. 345/173
(Continued)

FOREIGN PATENT DOCUMENTS

CN 1458565 11/2003
CN 101482791 7/2009
(Continued)

OTHER PUBLICATIONS

International Search Report dated Jan. 24, 2012, from corresponding International Application No. PCT/JP2011/006722.
(Continued)

*Primary Examiner* — Amit Chatly
(74) *Attorney, Agent, or Firm* — Katten Muchin Rosenman LLP

(57) ABSTRACT

An input control unit includes: a keyboard storage unit for storing keyboard screens each corresponding to a set of characters or symbols; a keyboard display unit for reading one of the keyboard screens and displaying the read keyboard screen on the screen; an input receiving unit for receiving a selection of the character or the symbol by the user; and a switching control unit for reading keyboard screens from the keyboard storage unit, displaying the read keyboard screens on the screen as selection candidates, and switching the selection candidate from among the plurality of keyboard screens. When the switching control unit receives a user control input to confirm the candidate being selected from the user, the keyboard display unit displays the keyboard screen selected on the screen, and receives a selection of the character or the symbol selected from the user.

14 Claims, 16 Drawing Sheets

(56) References Cited

U.S. PATENT DOCUMENTS

| | | | |
|---|---|---|---|
| 2010/0004029 A1* | 1/2010 | Kim | 455/566 |
| 2012/0188174 A1* | 7/2012 | Migos et al. | 345/173 |

FOREIGN PATENT DOCUMENTS

| | | |
|---|---|---|
| JP | 10-124226 | 5/1998 |
| WO | 2010/089918 | 8/2010 |

OTHER PUBLICATIONS

International Preliminary Report on Patentability and Written Opinion of the International Searching Authority dated Jul. 30, 2013, from corresponding International Application No. PCT/JP2011/006722.

Notification of Reason(s) for Refusal dated Jun. 18, 2013, from corresponding Japanese Application No. 2011-13353.

Chinese First Office Action dated Aug. 11, 2015 from corresponding Application No. 201180065463.0.

* cited by examiner

FIG. 20

| START SYMBOL | END SYMBOL |
|---|---|
| ( | ) |
| [ | ] |
| { | } |
| 〔 | 〕 |
| 【 | 】 |
| 〈 | 〉 |
| 《 | 》 |
| 「 | 」 |
| 『 | 』 |
| ' | ' |
| " | " |
| ″ | ″ |
| ! | ¡ |
| ? | ¿ |

# INPUT DEVICE, INPUT METHOD, AND COMPUTER PROGRAM FOR INPUTTING CHARACTERS, NUMBERS, OR SYMBOLS BY USING AN ON-SCREEN KEYBOARD

BACKGROUND OF THE INVENTION

1. Field of the Invention

The present invention generally relates to technology for entering characters, numbers, or symbols, and more particularly, to an input device and an input method for entering characters, numbers, or symbols by using an on-screen keyboard.

2. Description of the Related Art

A keyboard is generally used to input characters or symbols in devices, such as personal computers, word processors, or the like. However, in a mobile terminal (e.g., a portable type game device, a mobile phone, or the like), or in a household electrical appliance (e.g., a printer, a refrigerator, or the like), user has to input characters or symbols by using limited number of buttons, switches, or the like. Therefore, a variety of types of contrivance is required in order to improve user friendliness.

As an example of such contrivance, in a device where a display device (e.g., a liquid crystal panel or the like) is provided, a so-called on-screen keyboard is used, wherein a keyboard image is displayed on a display device and each key of the keyboard being displayed can be selected by a pointing device or the like. Particularly, in a device that provides a touch panel, a user can enter characters or symbols by touching respective keys of a keyboard being displayed. Therefore, similar operability with that of using a keyboard can be provided.

SUMMARY OF THE INVENTION

Although an on-screen keyboard contributes to the improvement of user friendliness in this manner, there are a lot of occasions to enter characters or symbols by using a mobile terminal or the like nowadays. Therefore, a user interface that realizes a more convenient input method is strongly required.

The present invention addresses the aforementioned issue, and a purpose thereof is to provide an input technology with high user friendliness.

According to an embodiment of the present invention, an input device is provided. The input device includes: a storage unit configured to store a plurality of keyboard screens each corresponding to a set of a plurality of characters or symbols, each keyboard screen being designed to show a set of a plurality of characters or symbols that can be input on a screen and receive a user's selection of a character or a symbol; a display unit configured to read one of the plurality of keyboard screens from the storage unit and display the read keyboard screen on the screen; an input receiving unit configured to receive the selection of the character or the symbol selected by the user from among the plurality of characters or symbols; and a switching control unit configured to cause, when a first user control input to switch the keyboard screen is received while the display unit is showing one of the plurality of keyboard screens on the screen and while the input receiving unit receives selection of a character or a symbol from the plurality of characters or symbols included in the keyboard screen displayed on the screen, the input device to make a transition to a switching mode to switch the keyboard screen, read a plurality of keyboard screens including the keyboard screen displayed on the screen from the storage unit, and display the read keyboard screens on the screen as selection candidates, the switching control unit being further configured to switch the selection candidate being selected from among the plurality of keyboard screens, when a second user control input to switch the selection candidate of the keyboard screen is received in the switching mode, wherein, when the switching control unit receives a third user control input to confirm the candidate being selected by the user in the switching mode, the display unit displays the keyboard screen selected as the candidate on the screen, and the input receiving unit receives the character or the symbol selected by the user from among the plurality of characters or symbols included in the displayed keyboard screen.

Optional combinations of the aforementioned constituting elements, and implementations of the invention in the form of methods, apparatuses, systems, or the like may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 20 shows examples of symbols used as a pair;

DETAILED DESCRIPTION OF THE INVENTION

The invention will now be described by reference to the preferred embodiments. This does not intend to limit the scope of the present invention, but to exemplify the invention.

Figure 1:
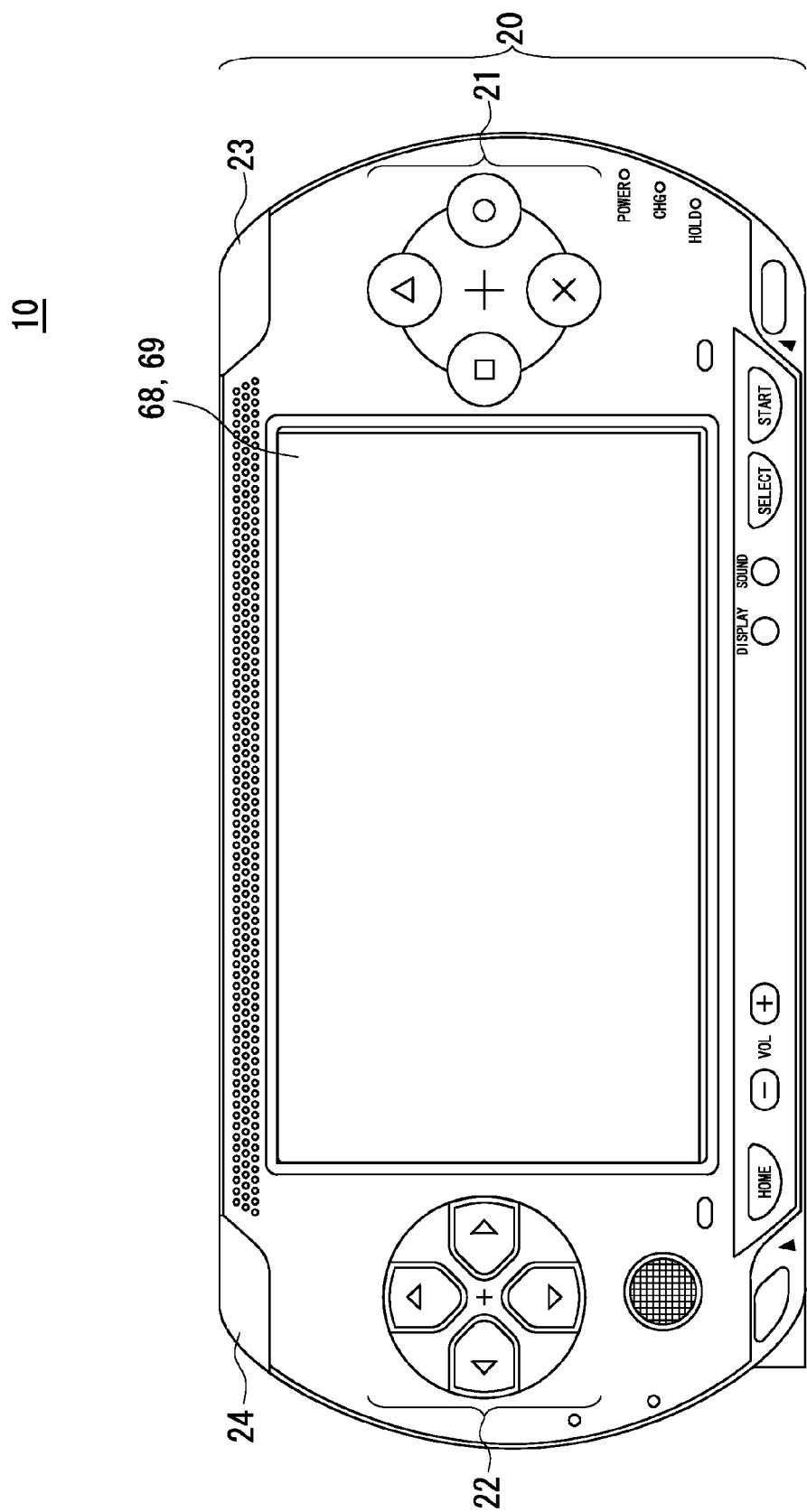
FIG. 1 shows an external view of a mobile terminal according to an exemplary embodiment.
Figure 2:
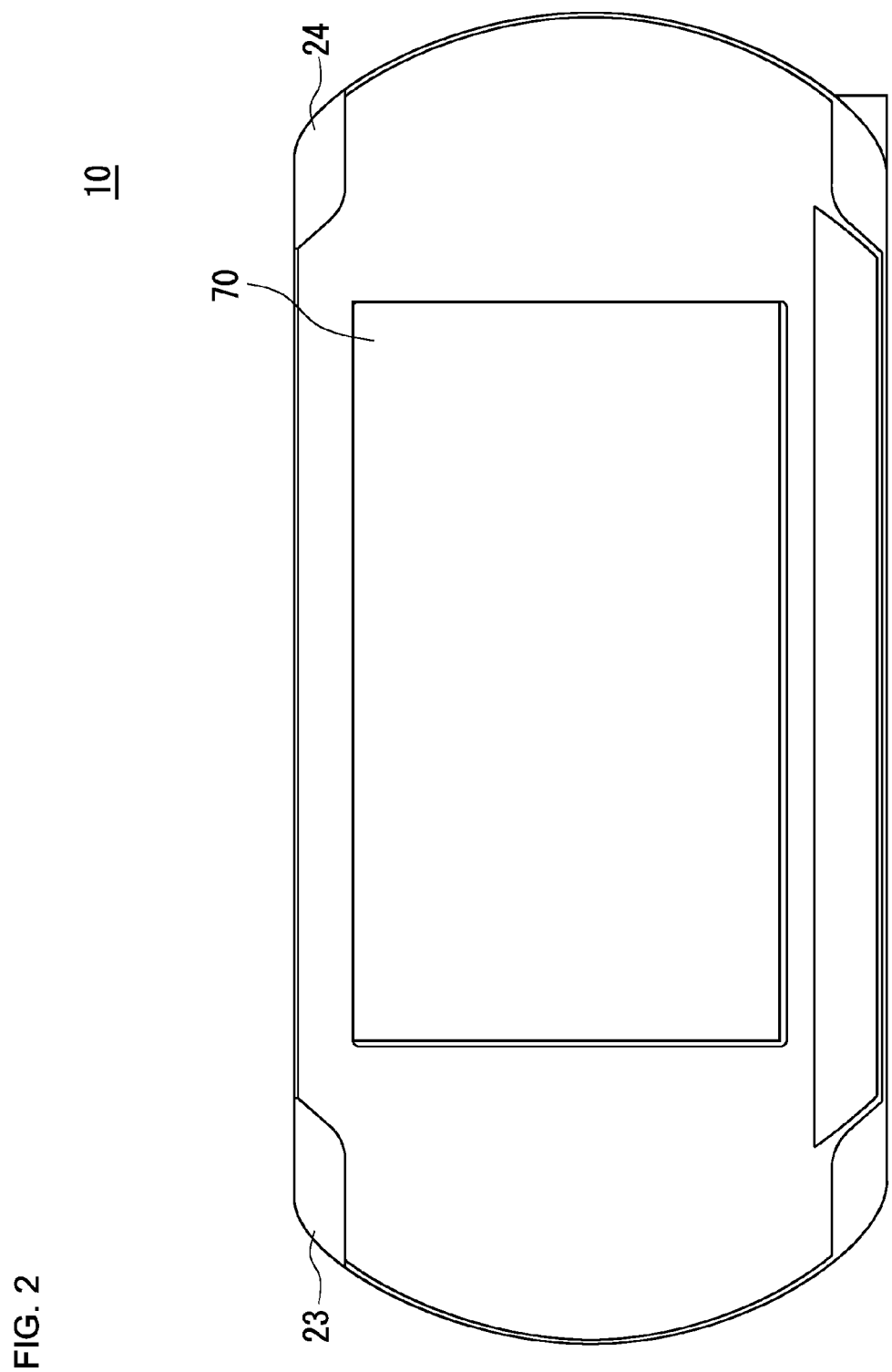
FIG. 2 shows an external view of the mobile terminal according to the exemplary embodiment.

FIGS. 1 and 2 show an external view of a mobile terminal 10 according to an exemplary embodiment. As shown in FIG. 1, on the front face of the mobile terminal 10 (i.e., the surface facing a user when the user holds and manipulates the mobile terminal 10), buttons 20 such as an instruction input button 21, directional keys 22, an R button 23, an L button 24, or the like, and a display device 68 are provided. With the display device 68, a touch panel 69 for detecting contact made by a finger of a user, a stylus pen, or the like is provided.

As shown in FIG. 2, on the rear face of the mobile terminal 10, a rear touch panel 70 is provided. Although a display device may be provided also on the rear face of the mobile terminal 10 in a similar manner with that of the front face, a display device is not provided on the rear face of the mobile terminal 10 and only the rear touch panel 70 is provided on the rear face according to the exemplary embodiment.

A user can, for example, manipulate the instruction input button 21 with his/her right hand thumb, manipulate the direction keys 22 with his/her left hand thumb, manipulate the R button 23 with his/her right hand index finger or middle finger, manipulate the L button 24 with his/her left hand index finger or middle finger, manipulate the touch panel 69 with his/her thumbs of both hands, and manipulate the rear touch panel 70 with his/her ring fingers or pinky fingers of both hands while holding the mobile terminal 10 with his/her both hands. In case of using a stylus pen or the like the user can manipulate the touch panel 69 and the instruction input button 21 for example with the right hand by using the stylus pen or by the index finger, manipulate the directional keys 22 with the left hand thumb, manipulate the L button 24 with the left hand index finger or middle finger, and manipulate the rear touch panel 70 with the left hand ring finger or the pinky finger while holding the mobile terminal 10 with the left hand.

Figure 3:
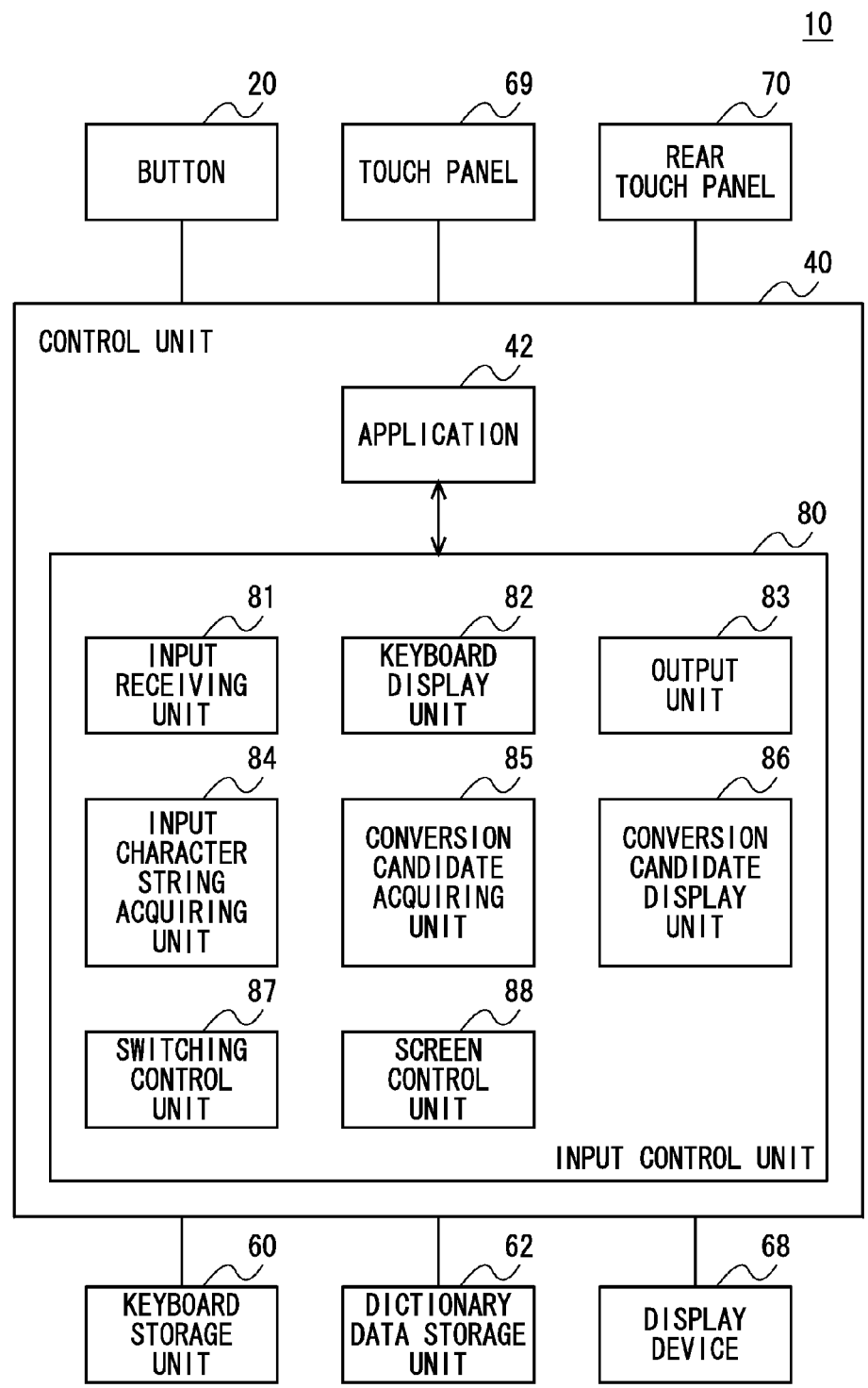
FIG. 3 shows the configuration of the mobile terminal.

FIG. 3 shows the configuration of the mobile terminal 10. The mobile terminal 10 comprises the buttons 20, the touch panel 69, the rear touch panel 70, a control unit 40, a keyboard storage unit 60, a dictionary data storage unit 62, and a display device 68. Those elements are implemented by a CPU of a computer, memory, a program loaded into the memory, or the like in terms of hardware components. FIG. 3 depicts functional blocks implemented by cooperation of these components. Therefore, it will be obvious to those skilled in the art that the functional blocks may be implemented in a variety of ways, by hardware only, software only, or a combination thereof.

The keyboard storage unit 60 retains screen data of an on-screen keyboard where a plurality of keys (e.g., character keys, number keys, symbol keys, or the like) that can be input by a user are arranged. According to the exemplary embodiment, the keyboard storage unit 60 retains screen data of a plurality of on-screen keyboards corresponding to a plurality of types of character set or symbol set so as to allow a user to input character strings in a plurality of languages. The dictionary data storage unit 62 retains dictionary data. If a Japanese word is input phonetically, the dictionary data is used in order to convert the input character string of the Japanese word into Kanji. If a part of an English word is input, the dictionary data is used in order to extract and display a complete word expected to be input.

The control unit 40 receives an operation input by a user via the buttons 20, the touch panel 69, and the rear touch panel 70. Based on the input operation received from the user, the control unit 40 executes an application 42 such as a game program or the like, executes an input function for entering characters or symbols into the application 42 or the like, or executes other various functions. The control unit 40 includes the application 42 and the input control unit 80. The input control unit 80 includes an input receiving unit 81, a keyboard display unit 82, an output unit 83, an input character string acquiring unit 84, a conversion candidate acquiring unit 85, a conversion candidate display unit 86, a switching control unit 87, and a screen control unit 88.

The keyboard display unit 82 reads a screen of an on-screen keyboard from the keyboard storage unit 60 and displays the on-screen keyboard on the display device 68. Based on an instruction input by a user through the button 20, the touch panel 69, or the rear touch panel 70, the input receiving unit 81 determines which of the keys on the on-screen keyboard is entered and receives user's selection of a character, a number, or a symbol.

The input character string acquiring unit 84 acquires the character selected by the user and received by the input receiving unit 81 and adds the character to an input character string. The conversion candidate acquiring unit 85 acquires one or more conversion candidate character strings, which is a conversion of a character string including the input character string. The conversion candidate acquiring unit 85 may acquire one or more conversion candidate character strings when the conversion candidate acquiring unit 85 receives from a user an instruction to request the display of conversion candidate character strings, which are conversions of the input character string. Alternatively, the conversion candidate acquiring unit 85 may acquire conversion candidate character strings, which are conversions of the input character string, when an addition is made to the input character string. The conversion candidate acquiring unit 85 may acquire expected conversion candidate character strings, which are extracted from conversion candidate character strings that are conversions of character strings including the input character string in the beginning thereof by assuming following input character strings. The conversion candidate acquiring unit 85 may generate conversion candidate character strings by referring the dictionary data storage unit 62, or may notify another device or application of the input character string so as to acquire conversion candidate character strings converted by the device or the application. The conversion candidate acquiring unit 85 may utilize any known technology as a conversion function or as a predictive conversion function. In case of acquiring a plurality of conversion candidate character strings, the conversion candidate acquiring unit 85 also acquires the order of displaying the strings.

The conversion candidate display unit 86 displays the conversion candidate character strings acquired by the conversion candidate acquiring unit 85 in the order of displaying on the display device 68. If a user determines one conversion candidate character string among the conversion candidate character strings displayed by the conversion candidate display unit 86 by touching one of the conversion candidate character strings, by selecting or pressing a determination key or the like for fixing a conversion candidate character string being selected, the input receiving unit 81 receives the determination and the output unit 83 outputs the determined conversion candidate character string to the application 42 or the like. For a character string that does not require conversion, such as an alphanumeric character string or a symbol string, the output unit 83 may output the string directly without conversion. For example, in case an on-screen keyboard for entering Japanese is selected, an output may be made via the conversion function even if an alphanumeric character string or a symbol string is input, and in case an on-screen keyboard for entering English is selected, an output may be made directly without the conversion function. Even in case an on-screen keyboard for entering English is selected, a predictive conversion function as described above may be used for English words. The details on aforementioned basic technologies for an on-screen keyboard will not be given here since any known technology can be used.

The switching control unit 87 switches on-screen keyboards utilized by a user among a plurality of on-screen keyboards stored in the keyboard storage unit 60. The screen control unit 88 controls a display status of a screen displayed by the application 42 and an on-screen keyboard screen. The detail on these functions will be described later.

Figure 4:
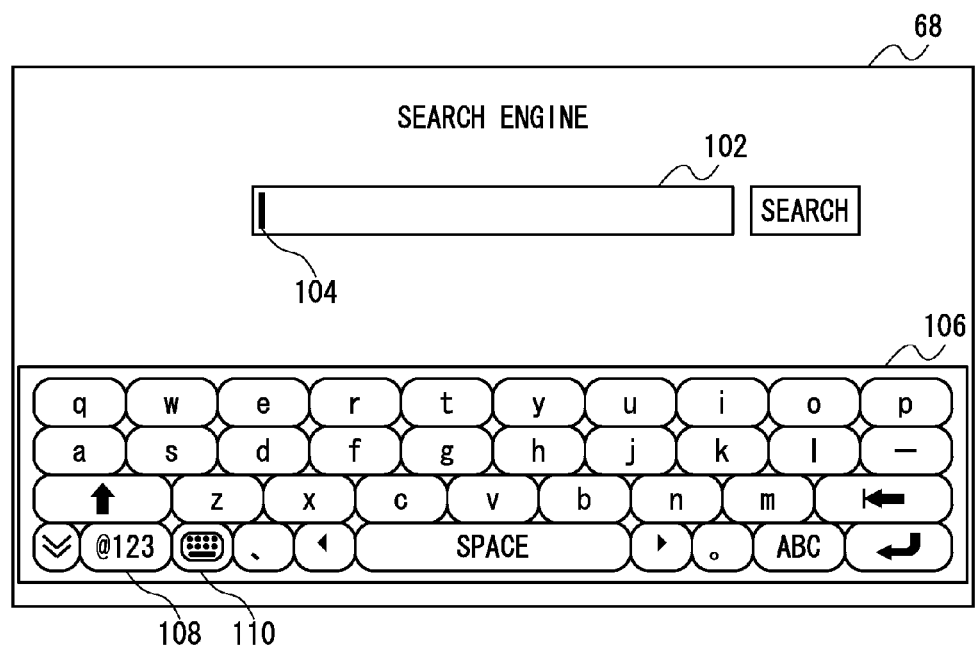
FIG. 4 shows an exemplary screen wherein an on-screen keyboard is displayed.

FIG. 4 shows an exemplary screen wherein an on-screen keyboard is displayed. If a text box 102, which is for entering a search keyword and which the application 42 has displayed on a screen, is activated, the application 42 displays a caret 104 indicating an input position in the text box 102 and activates the input control unit 80 in order to receive an input character string. The keyboard display unit 82 reads a screen of a predetermined type of an on-screen keyboard from the keyboard storage unit 60 and displays the on-screen keyboard. In FIG. 4, an on-screen keyboard 106 for entering Japanese is displayed.

Figure 5:
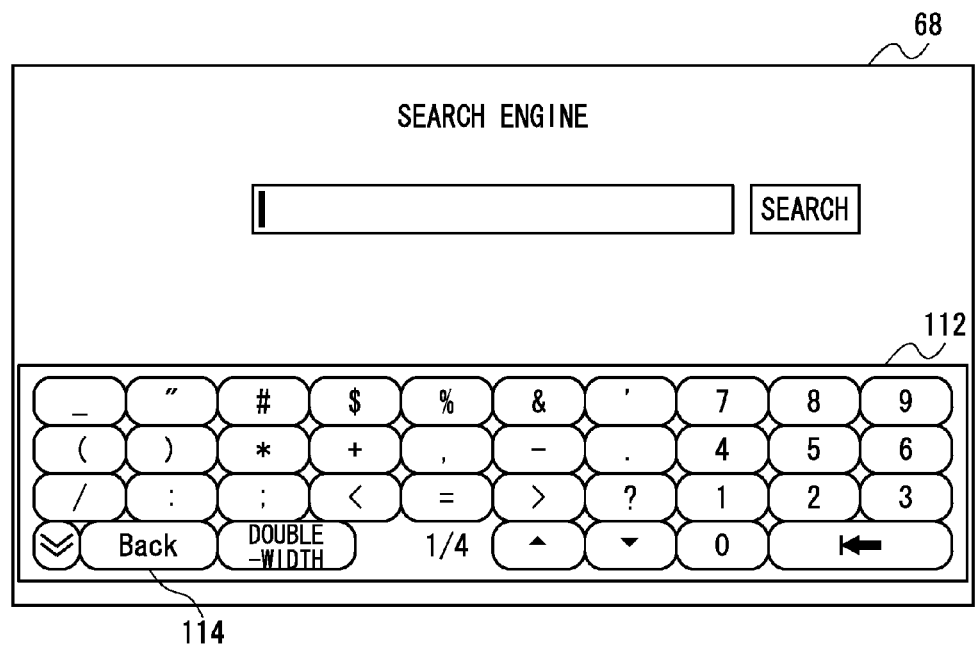
FIG. 5 shows an exemplary screen wherein an on-screen keyboard is displayed.

The on-screen keyboard 106 for entering Japanese includes a sub screen for entering symbols or numbers in addition to a basic screen for entering Japanese characters. If the button 108 for switching to a sub screen is entered on the on-screen keyboard 106, the keyboard display unit 82 reads a sub screen 112 of an on-screen keyboard for entering Japanese from the keyboard storage unit 60 and displays the sub screen 112 on the display device 68 as shown in FIG. 5. If a button 114 for switching to a basic screen is entered on the sub screen 112, the keyboard display unit 82 displays the basic screen shown in FIG. 4 again.

(Scrolling Conversion Candidate Character Strings)

Figure 6:
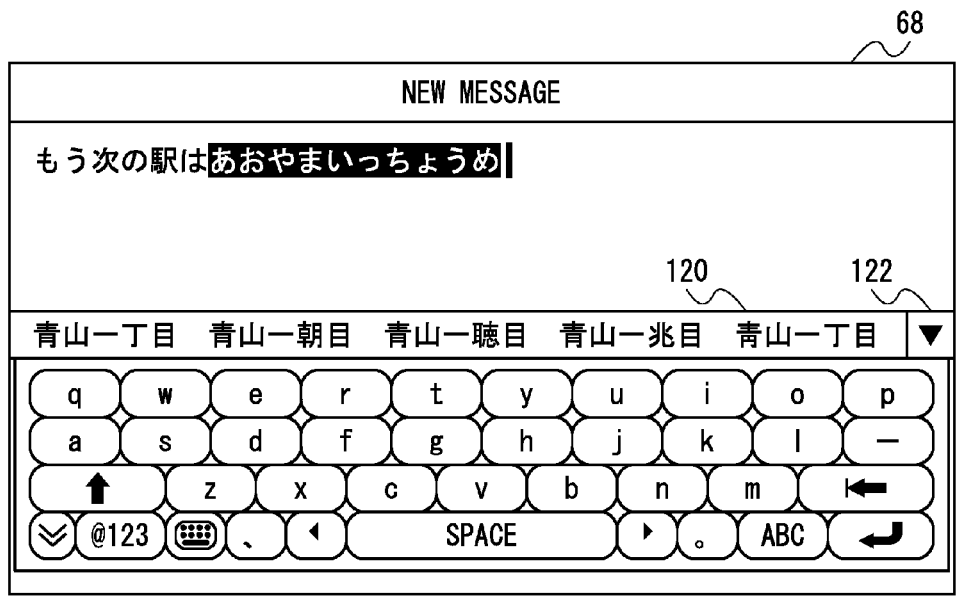
FIG. 6 shows an image for illustrating a function for scrolling conversion candidate character strings being displayed.

FIGS. 6 to 11 show images for illustrating a function for scrolling conversion candidate character strings being displayed. The conversion candidate display unit 86 displays the conversion candidate character strings, which are acquired by the conversion candidate acquiring unit 85, in the order of displaying in the conversion candidate display row 120 as shown in FIG. 6. The conversion candidate display unit 86 displays a conversion candidate character string having the highest priority of the displaying order at the left end of the conversion candidate display row 120, and displays following conversion candidate character strings in the order of displaying from left to right, subsequently. In FIG. 6, character strings, such as, "Aoyama icchoume (in a combination of Kanji)," Aoyama icchoume (in another combination of Kanji), etc. are displayed in sequence as conversion candidate character strings of "Aoyama icchoume (in Hiragana)" in the conversion candidate display row 120.

In case that there are too many conversion candidate character strings to display and the conversion candidate character strings do not fit within the conversion candidate display row 120, the conversion candidate display unit 86 displays a portion of the conversion candidate character strings that can be displayed in the conversion candidate display row 120, and concurrently displays a list display button 122 for displaying conversion candidate character strings as a list. Upon receiving an input for the list display button 122, the conversion candidate display unit 86 broadens the display region for conversion candidate character strings and displays the conversion candidate character strings as a list.

Figure 7:
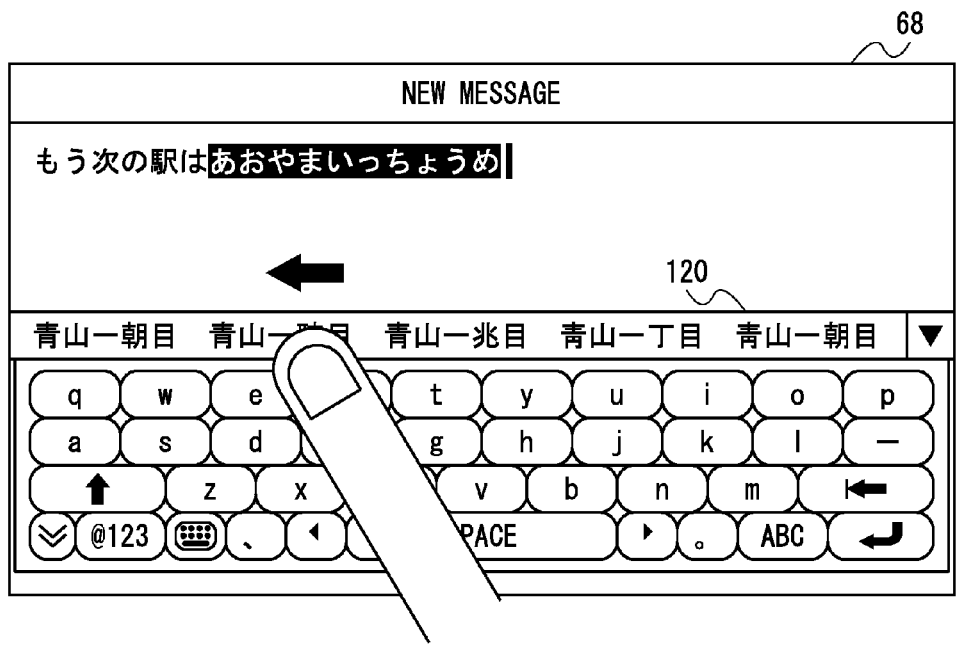
FIG. 7 shows an image for illustrating a function for scrolling conversion candidate character strings being displayed.

As shown in FIG. 7, in case that all of the conversion candidate character strings can not be displayed in the conversion candidate display row 120, the conversion candidate display unit 86 causes the conversion candidate character strings to scroll in the conversion candidate display row 120 upon receiving a flick operation on the conversion candidate display row 120. In FIG. 7, since a user slides his/her finger to the left, the conversion candidate display unit 86 causes the conversion candidate character strings to scroll to the left. Consequently, conversion candidate character strings of a lower priority in the displaying order, which have not been displayed in the conversion candidate display row 120, can be scrolled and displayed sequentially. The conversion candidate display unit 86 causes the conversion candidate character strings to scroll cyclically by displaying the first conversion candidate character string, which is the first in the displaying order, subsequent to the last conversion candidate character string, which is the last in the displaying order. Consequently, if a user wants to move back to a conversion candidate character string of a higher priority in the displaying order after scrolling conversion candidate character strings in the displaying order, the user can readily move back to the first conversion candidate character string in the displaying order by keeping scrolling in the forward direction instead of moving back by scrolling in the opposite direction. Therefore, user friendliness can be improved.

Figure 8:
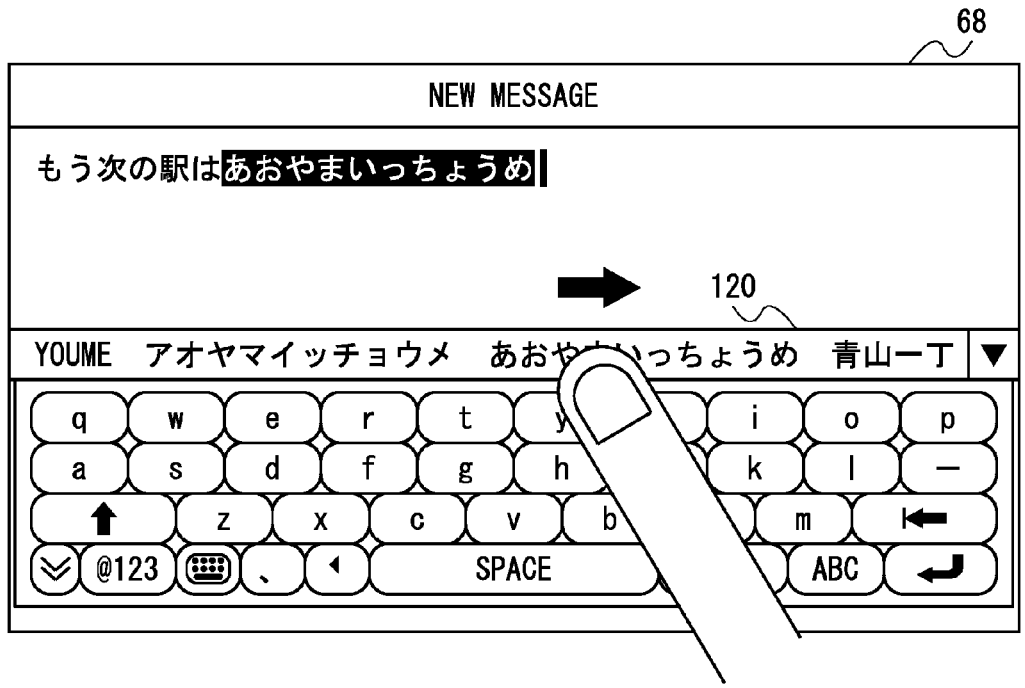
FIG. 8 shows an image for illustrating a function for scrolling conversion candidate character strings being displayed.
Figure 9:
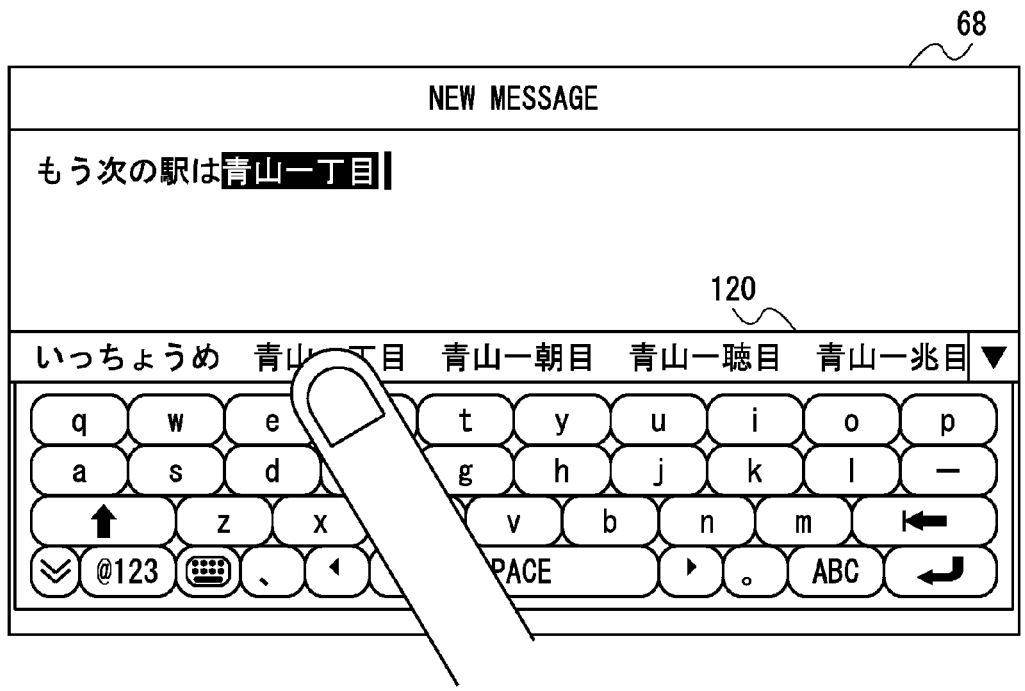
FIG. 9 shows an image for illustrating a function for scrolling conversion candidate character strings being displayed.

In FIG. 8, since a user slides his/her finger to right, the conversion candidate character strings are scrolled to the right. In this process, upon receiving a flick operation to scroll the conversion candidate character strings in the direction opposite from that of the displaying order while the first conversion candidate character in the displaying order is displayed, the conversion candidate display unit 86 causes the conversion candidate character strings to scroll in the opposite direction, starting from the last conversion candidate character string in the displaying order. That is, when scrolling conversion candidate character strings to the right, the last conversion candidate character string in the displaying order is displayed subsequent to the first conversion candidate character string in the displaying order. Consequently, by performing a flick operation in the right direction on the first display screen shown in FIG. 6, conversion candidate character strings of lower priority can be readily displayed from the last conversion candidate character string in the displaying order. Therefore, user friendliness can be improved.

While scrolling the conversion candidate character strings in the opposite direction, before displaying the last conversion candidate character string in the displaying order subsequent to the first conversion candidate character string in the displaying order, the conversion candidate display unit 86: once stops scrolling; or once stops scrolling and then scrolls a predetermined amount back in the forward direction, and then scrolls the strings in the opposite direction again. In a similar manner, while scrolling the conversion candidate character strings in the forward direction, before displaying the first conversion candidate character string in the displaying order subsequent to the last conversion candidate character string in the displaying order, the conversion candidate display unit 86 may: once stop scrolling; or once stop scrolling and then scroll a predetermined amount back in the opposite direction, and may scroll the strings in the forward direction again. This enables the conversion candidate character strings to scroll cyclically by connecting the first conversion candidate character string in the displaying order and the last conversion candidate character string in the displaying order, and concurrently allows a user to recognize the border between them.

According to the exemplary embodiment, conversion candidate character strings are classified into three groups and the displaying order is first determined among the groups. The three groups are: a group of character strings including Kanji, a group of character strings including only Japanese Kana (i.e., Japanese Hiragana and/or Japanese Katakana), a group of character strings including Japanese Romaji (i.e., Japanese written in Roman characters). For example, the displaying order may be defined as the order: the group of character strings including Kanji; the group of character strings including only Kana; and the group of character strings including Romaji. In each of the groups, the displaying order of conversion candidate character strings is further determined. For example, in case that a user wants to search for a conversion candidate character string belonging to a group of a higher priority in the displaying order (e.g., a character string including Kanji), the user just has to scroll the conversion candidate character strings in the conversion candidate display row to the left so that the conversion candidate character strings are displayed subsequently starting from the first conversion candidate character string in the displaying order to that of a lower priority. Alternatively, in case that a user wants to search for a conversion candidate character string belonging to a group of a lower priority in the displaying order (e.g., a character string in Romaji, or a character string only including Kana), the user just has to scroll the conversion candidate character strings in the conversion candidate display row to the right so that the conversion candidate character strings are displayed subsequently starting from the last conversion candidate character string in the displaying order to that of a higher priority. This improves user friendliness.

Figure 10:
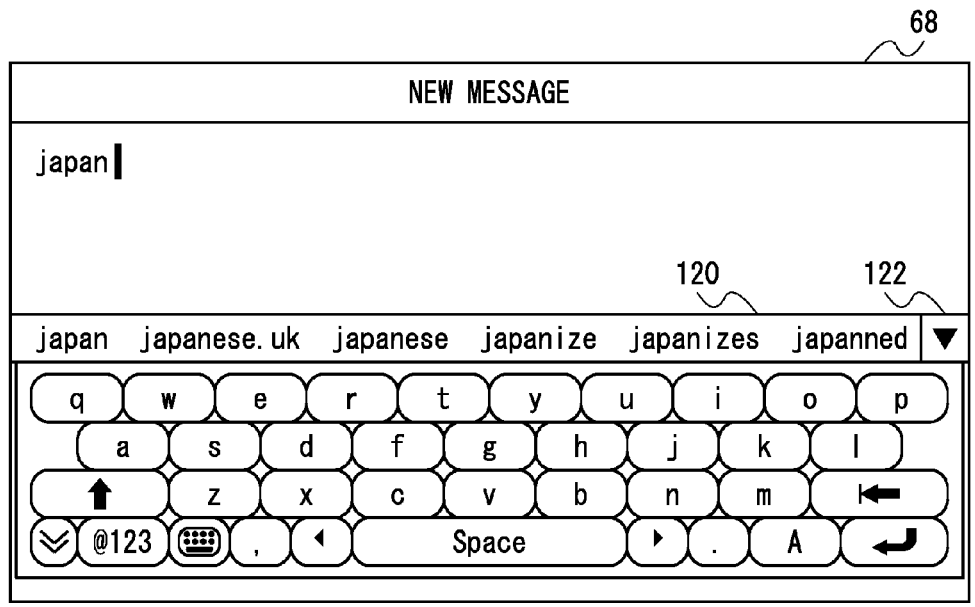
FIG. 10 shows an image for illustrating a function for scrolling conversion candidate character strings being displayed.

Although an explanation has been given on a case where a character string in Japanese is input regarding FIGS. 6 to 9, a similar explanation applies to a case where a character string in English is input as shown in FIG. 10. As described above, if the input character string acquiring unit 84 acquires an input character string in Roman alphabet, the conversion candidate acquiring unit 85 acquires expected conversion candidate character strings including the input character string or including a character string similar to the input character string, and the conversion candidate display unit 86 displays a plurality of expected conversion candidate character strings having been acquired in the conversion candidate display row 120. In the example shown in FIG. 10, character strings, such as, "japan," "japanese.uk," "Japanese," etc. are displayed in the conversion candidate display row 120 as a conversion candidate character string of "japan," which is the input character string. If a user performs a flick operation in the right or in the left direction in the conversion candidate display row 120, the conversion candidate display unit 86 scrolls the conversion candidate character strings to the right or to the left and displays conversion candidate character strings which have not been displayed sequentially.

Figure 11:
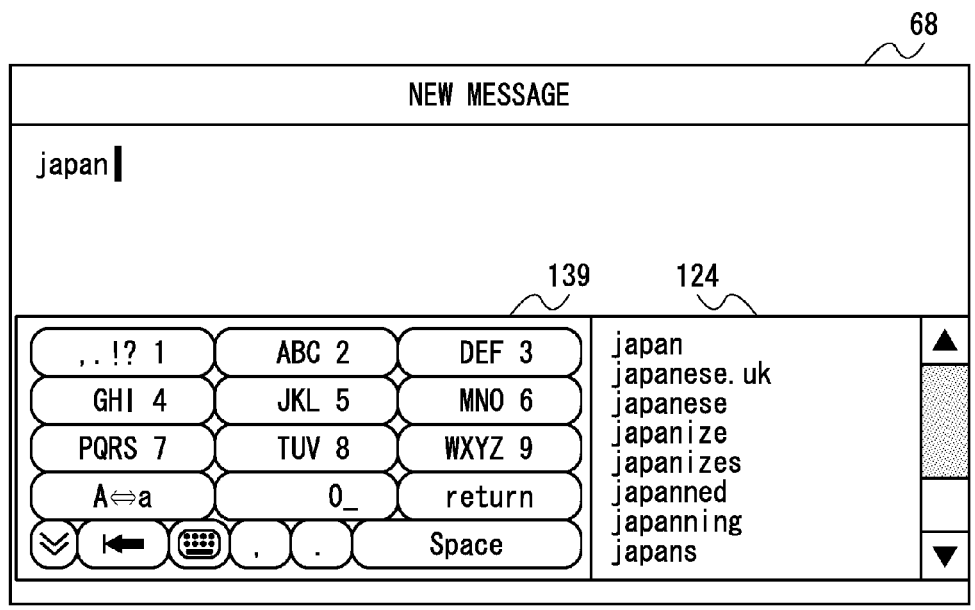
FIG. 11 shows an image for illustrating a function for scrolling conversion candidate character strings being displayed.

Although an explanation has been given on a case where a character string is input by using a horizontally long keyboard in FIGS. 6 to 10, a keyboard 139 similar to a keypad on a mobile phone may be used as shown in FIG. 11. In this case, the conversion candidate display unit 86 may display a plurality of expected conversion candidate character strings in a vertical layout in the conversion candidate display column 124 as shown in FIG. 11. Upon receiving a flick operation upwards or downwards in the conversion candidate display column 124, the conversion candidate display unit 86 scrolls the conversion candidate character strings upwards or downwards and displays conversion candidate character strings which have not been displayed sequentially.

Figure 12:
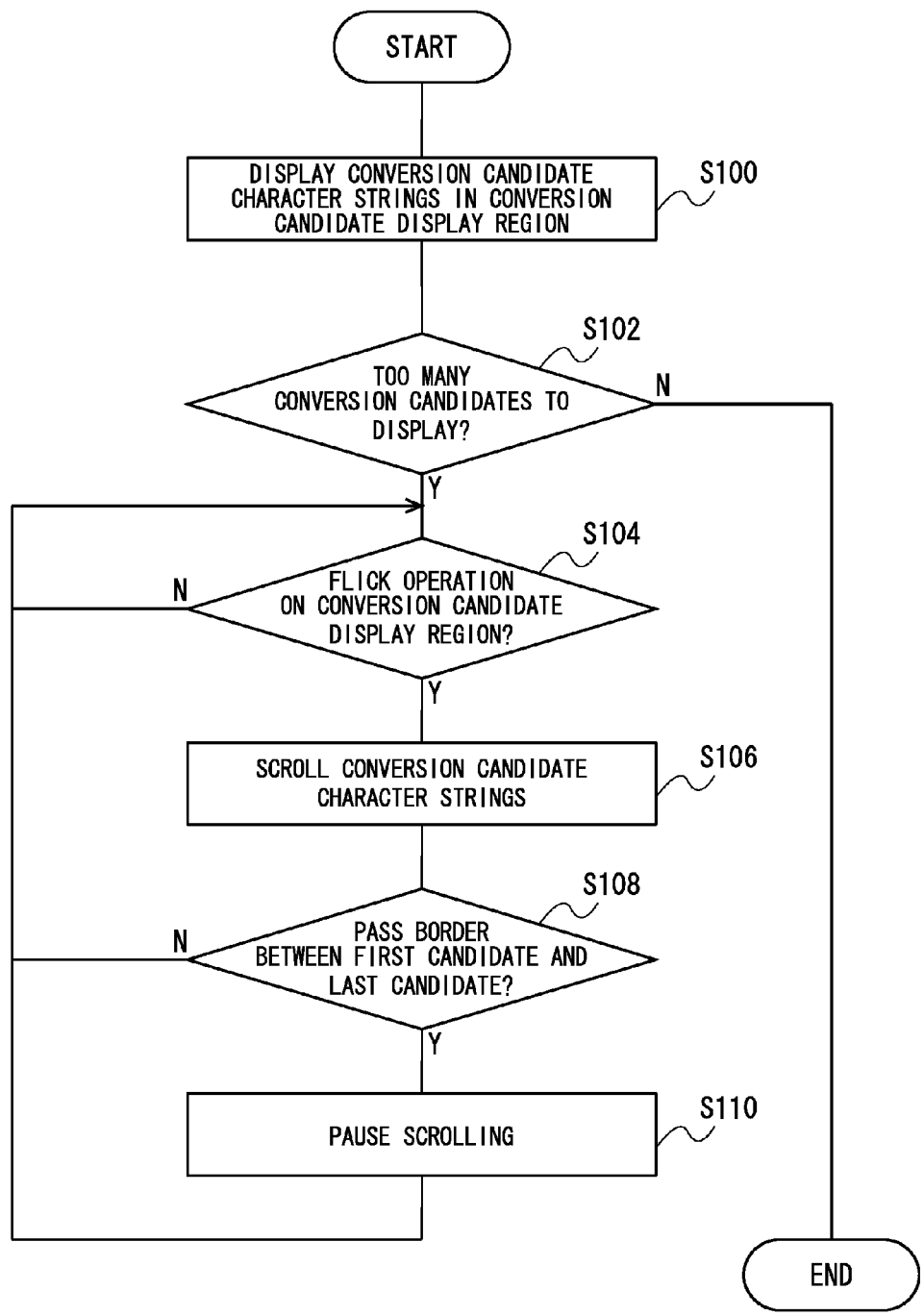
FIG. 12 shows a flowchart indicating a procedure for scrolling conversion candidate character strings.

FIG. 12 shows a flowchart indicating a procedure for scrolling conversion candidate character strings. If the conversion candidate acquiring unit 85 acquires one or more conversion candidate character strings, the conversion candidate display unit 86 displays the conversion candidate character strings in the conversion candidate display region (S100). In case that all of the conversion candidate character strings are displayed in the conversion candidate display region (N in S102), the conversion candidate display unit 86 skips the following steps. In case that the conversion candidate character strings do not fit within the conversion candidate display region and all conversion candidate character strings can not be displayed in the conversion candidate display region (Y in S102), upon receiving a flick operation on the conversion candidate display region (Y in S104), the conversion candidate display unit 86 causes the conversion candidate character strings to scroll (S106). In this process, in case of passing the border between the first conversion candidate character string in the displaying order and the last conversion candidate character string in the displaying order (Y in S108), the scrolling is stopped for a predetermined time period (S110) and the procedure returns to step S104. In case that no flick operation is received in the conversion candidate display region in step S104 (N in S104), or in case of not passing the border between the first conversion candidate character string in the displaying order and the last conversion candidate character string in the displaying order in step S108 (N in S108), the procedure returns to step S104.

(Switch Control of Keyboards)

Figure 13:
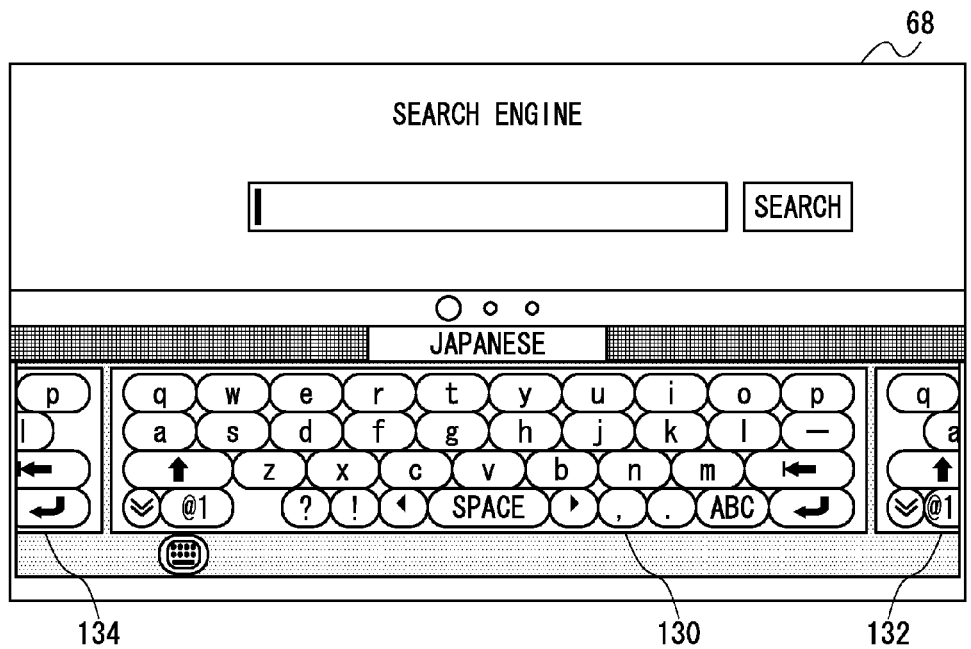
FIG. 13 shows an image for illustrating a function for switching keyboards.

FIGS. 13 to 16 show images for illustrating a function for switching keyboards. In the screen shown in FIG. 4, upon receiving an input for the keyboard switching button 110, the switching control unit 87 causes a transition to a switching mode for switching on-screen keyboards, reads a keyboard image 130, which is a scaled down on-screen keyboard 106 being displayed, from the keyboard storage unit 60 and displays the keyboard image 130 as shown in FIG. 13. Since the keyboard image 130 is smaller than the on-screen keyboard 106, if the keyboard image 130 is displayed in the center in the horizontal direction, available spaces emerge on the right and left of the keyboard image 130. The switching control unit 87 reads one or more keyboard images that are scaled-down images of other on-screen keyboards available for switching from the keyboard storage unit 60 and displays the keyboard images in accordance with a displaying order thereof. For example, the switching control unit 87 displays a keyboard image 132 subsequent in the displaying order on the right and displays a keyboard image 134 preceding in the display order on the left, respectively.

Figure 14:
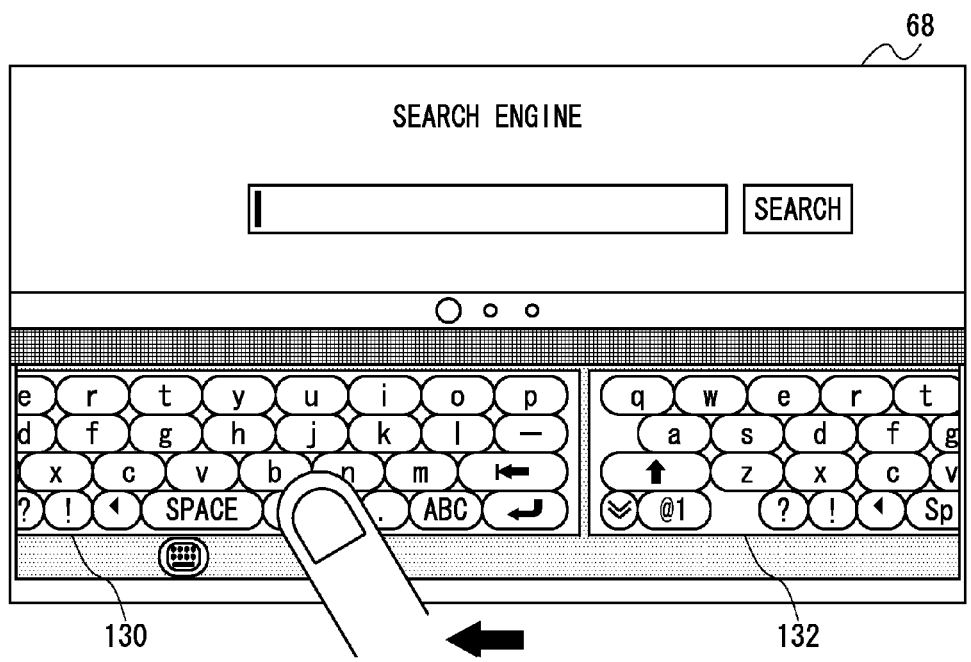
FIG. 14 shows an image for illustrating a function for switching keyboards.
Figure 15:
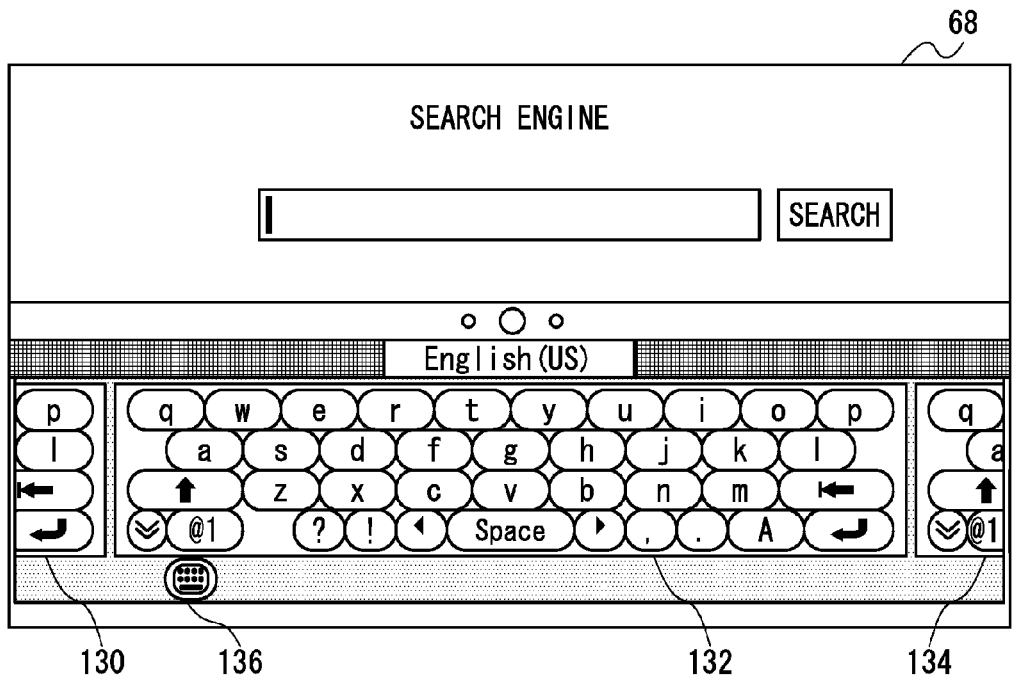
FIG. 15 shows an image for illustrating a function for switching keyboards.
Figure 16:
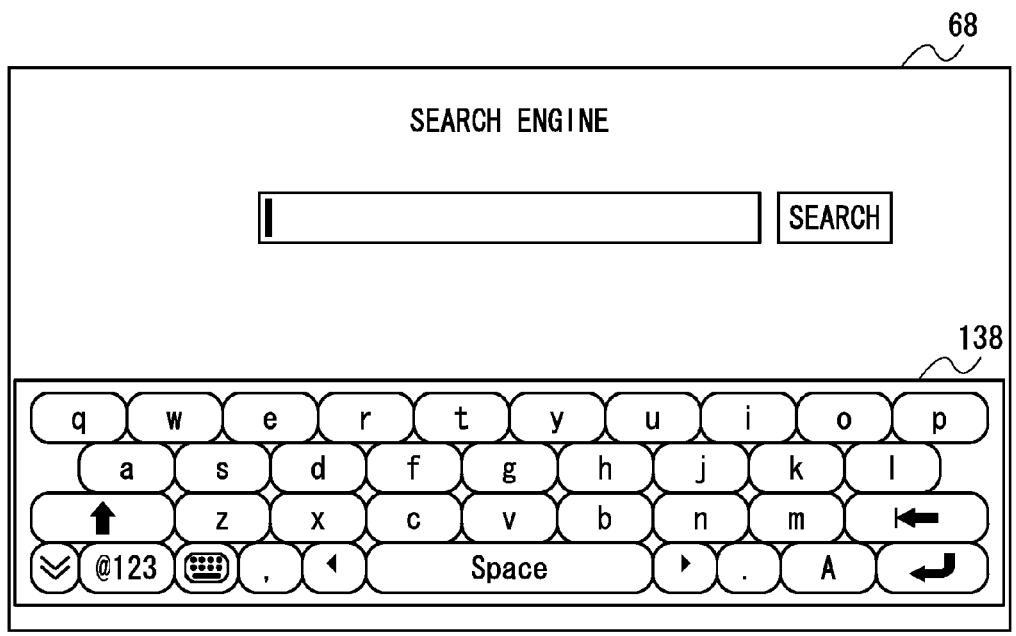
FIG. 16 shows an image for illustrating a function for switching keyboards.

Upon receiving a flick operation on the region where the keyboard images are displayed, the switching control unit 87 scrolls a plurality of keyboard images to the right or to the left as shown in FIG. 14. In FIG. 14, since a user slides his/her finger to the left, the switching control unit 87 causes the keyboard images to scroll to the left. As shown in FIG. 15, the switching control unit 87 stops the scrolling in a state where one of the keyboard images is displayed in the center in the horizontal direction. In FIG. 15, the keyboard image 132 of an on-screen keyboard for entering English alphabet is displayed in the center. In this process, if a user inputs the button 136 for accepting a keyboard that is displayed in the center and selected as a candidate, the switching control unit 87 terminates the switching mode and reads an on-screen keyboard 138 that corresponds to the keyboard image 132 that has been selected as a candidate from the keyboard storage unit 60 and displays the on-screen keyboard 138 as shown in FIG. 16. Consequently, even in case that a plurality of on-screen keyboards are provided, a user can readily switch and use the keyboards, which improves user friendliness.

Upon receiving a tap operation on one of the keyboard images, the switching control unit 87 may switch a keyboard to the on-screen keyboard corresponding to the tapped keyboard image. For example, upon receiving a tap operation on the keyboard image 132 that is displayed on the right in the state shown in FIG. 13, the switching control unit 87 may switch an on-screen keyboard to the on-screen keyboard 138 for inputting English corresponding to the keyboard image 132 as shown in FIG. 16. Consequently, as a user can readily switch an on-screen keyboard to another on-screen keyboard without scrolling keyboard images, user friendliness can be improved.

According to the exemplary embodiment, each on-screen keyboard includes a basic screen for inputting characters and a sub screen for inputting symbols or numbers as described above. However, a user has difficulty in determining which type of on-screen keyboard is shown even if the user views a keyboard image of a sub screen since a sub screen image is substantially same as that of another on-screen keyboard regardless of the type of on-screen keyboards. Therefore, the switching control unit 87 does not accept an input instruction to switch keyboard screens when a sub screen is displayed and allows the transition to the switching mode only when a basic screen is displayed.

If the switching control unit 87 causes a transition to the switching mode, the screen of an on-screen keyboard is switched to a keyboard image of a scaled-down on-screen keyboard, and parts of other keyboard images are displayed on the left and on the right. This allows a user to understand intuitively that he/she can switch on-screen keyboards by scrolling the keyboard images. The switching control unit 87 may adopt a visual expression where an on-screen keyboard appears as if it is once pressed down when making transition to a switching mode. In this case, an instruction to be input in order to make transition to a switching mode may be an operation looking as if pressing down an on-screen keyboard, for example the operation may be a press-and-hold operation at a predetermined position on the on-screen keyboard. Conversely, the switching control unit 87 may adopt a visual expression where an on-screen keyboard appears as if it once floats when making transition to a switching mode. In this case, an instruction to be input in order to make transition to a switching mode may be an operation looking as if causing the on-screen keyboard to float, for example the operation may be a tap or a press-and-hold at a predetermined position on the rear touch panel 70.

Figure 17:
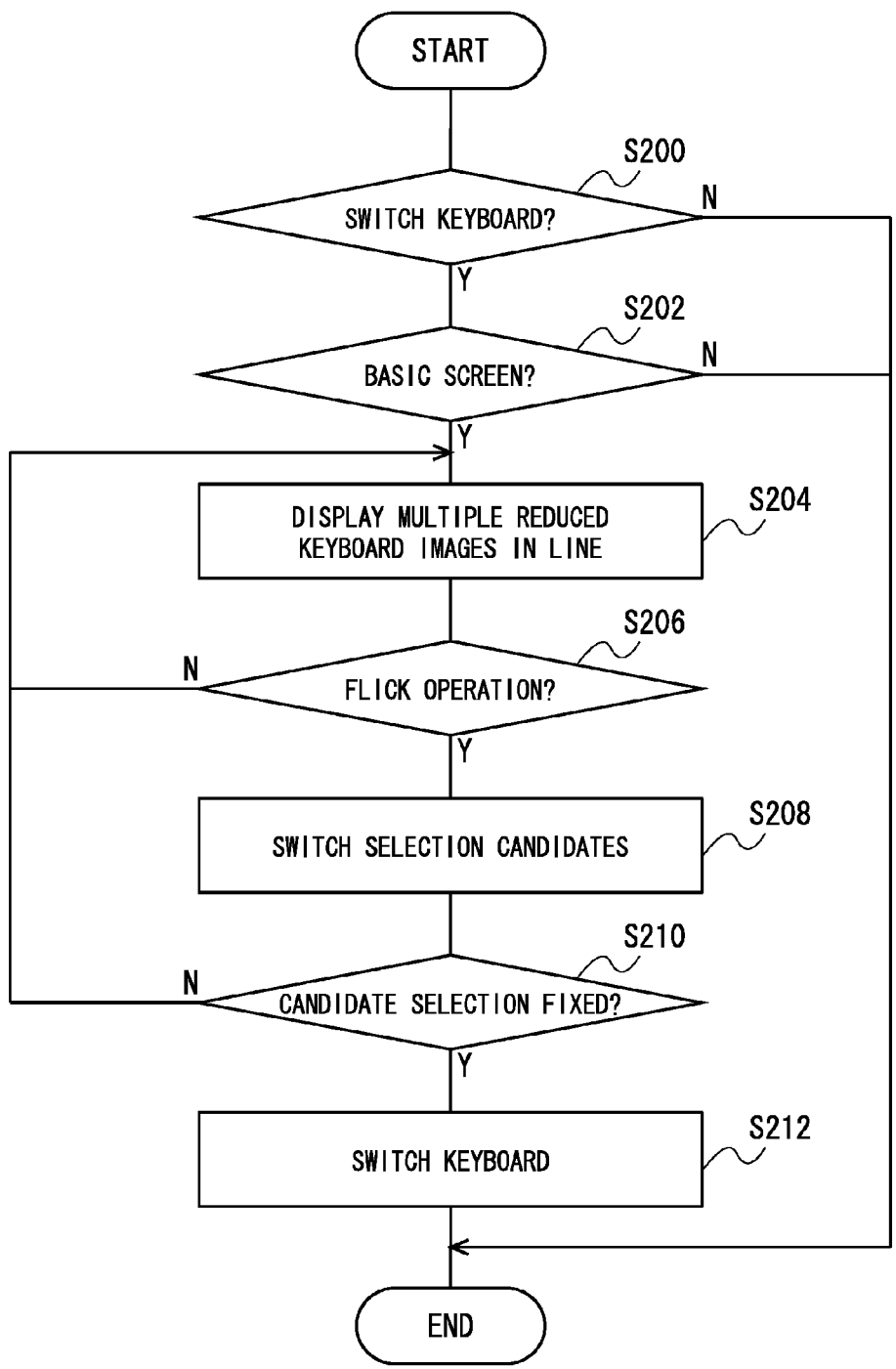
FIG. 17 shows a flowchart indicating a procedure for switching keyboards.

FIG. 17 shows a flowchart indicating a procedure for switching keyboards. Upon receiving an operation for switching on-screen keyboards from a user (Y in S200) when the keyboard display unit 82 displays an on-screen keyboard and the device is standing by for user input, the switching control unit 87 displays a plurality of reduced keyboard images side by side (S204) if a basic screen is being displayed (Y in S202). Upon receiving a flick operation on the region where the keyboard images are displayed (Y in S206), the switching control unit 87 scrolls a plurality of keyboard images to the right or to the left so as to switch candidates for selection (S208). Upon receiving an operation for fixing a candidate for selection from a user (Y in S210), the switching control unit 87 switches an on-screen keyboard to the determined on-screen keyboard (S212). If an operation for switching on-screen keyboards are not received (N in S200), or if a basic screen is not being displayed (N in S202), the following steps will be skipped. If a flick operation is not received in step S206 (N in S206), or an operation for fixing a candidate for selection is not received in step S210 (N in S210), the procedure returns to step S204.

(Input Control for Symbols Used as a Pair)

Figure 18:
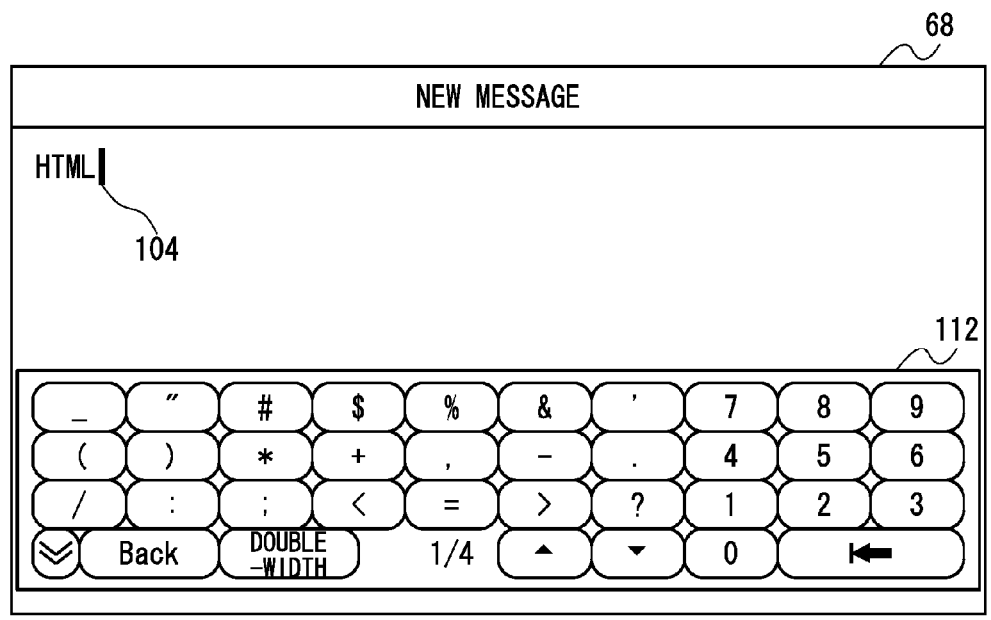
FIG. 18 shows an image for illustrating an input control function for symbols used as a pair.
Figure 19:
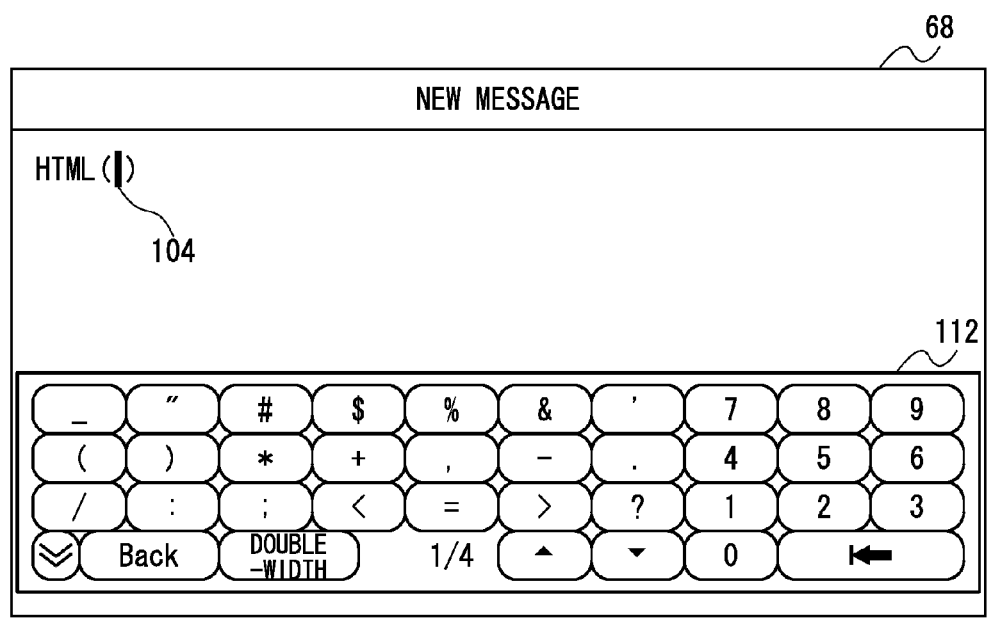
FIG. 19 shows an image for illustrating an input control function for symbols used as a pair.

FIGS. 18 and 19 show images for illustrating an input control function for symbols used as a pair. The input character string acquiring unit 84 stores in advance a start symbol and an end symbol that should be input as a pair (e.g., parenthesis symbols, quotation marks, interrogation marks, exclamation marks, or the likes). If a start symbol included in the symbols or character strings stored in advance is input while the sub screen 112 for inputting symbols is displayed as shown in FIG. 18, the input character string acquiring unit 84 acquires not only the start symbol but also the end symbol that is coupled to the start symbol as an input character string. Further, the input character string acquiring unit 84 moves a caret 104 indicating an input position to a position between the start symbol "(" and the end symbol ")" as shown in FIG. 19. This frees a user from the trouble of inputting an end symbol. In addition, following to the input of the start symbol, the user can easily input a character string, which should be input between the start symbol and the end symbol, between the start symbol and the end symbol. Therefore, user friendliness can be improved.

Figure 20:
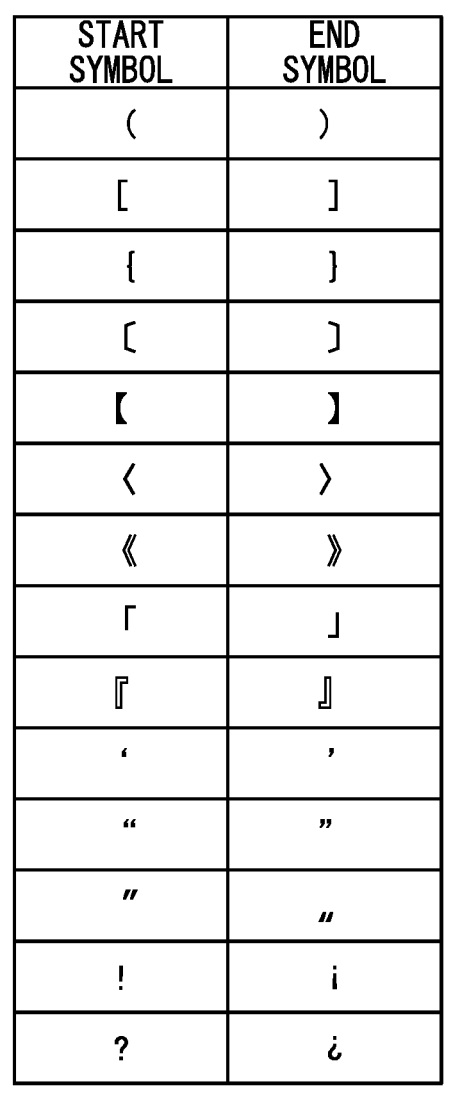

FIG. 20 shows examples of a symbol or the like used as a pair. The input character string acquiring unit 84 stores for example combinations of symbols shown in FIG. 20 as a combination of a start symbol and an end symbol that should be input as a pair. The input character string acquiring unit 84 may not only store single symbols, but may also store symbols of which the start symbol or the end symbol is a combination of two or more symbols, numbers, or characters, such as, a block comment symbol (e.g., "!--" and "--," "/*" and "*/," or the like), a start tag and an end tag in a Markup language, an opening and a closing for a letter, etc.

An input character string that is acquired by the input character string acquiring unit 84 and includes a start symbol and an end symbol may be output directly from the output unit 83, or may be passed to the conversion candidate acquiring unit 85 as an unfixed character string. In the former case, if an application, an OS or the like of the output destination control the position of a caret, the input character string acquiring unit 84 may instructs the output destination to move the position of the caret to a position between a start symbol and an end symbol.

This function can be applied not only to an on-screen keyboard but also to any input device for inputting symbols or the like.

Figure 21:
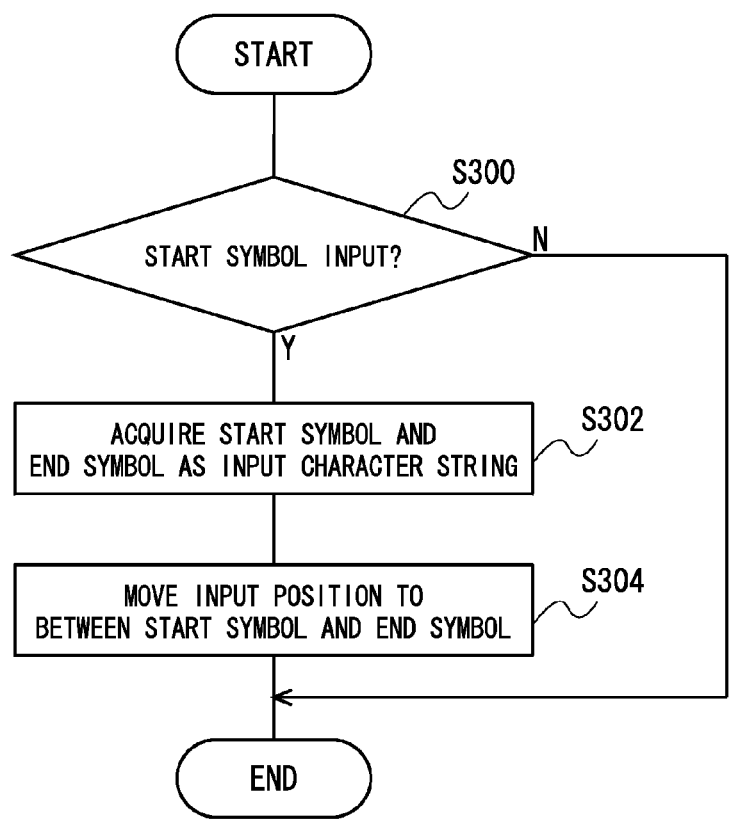
FIG. 21 shows a flowchart indicating a procedure of an input control method for symbols used as a pair.

FIG. 21 shows a flowchart indicating a procedure of an input control method for symbols used as a pair. If a start symbol is entered (Y in S300), while the keyboard display unit 82 is displaying an on-screen keyboard and the device is standing by for user input, the input character string acquiring unit 84 acquires the start symbol and the end symbol as an input character string (S302), and moves a caret indicating an input position to a position between the start symbol and the end symbol (S304). If a start symbol is not input (N in S300), the following steps will be skipped.

(Display Control for an on-Screen Keyboard Screen and an Application Screen)

Figure 22:
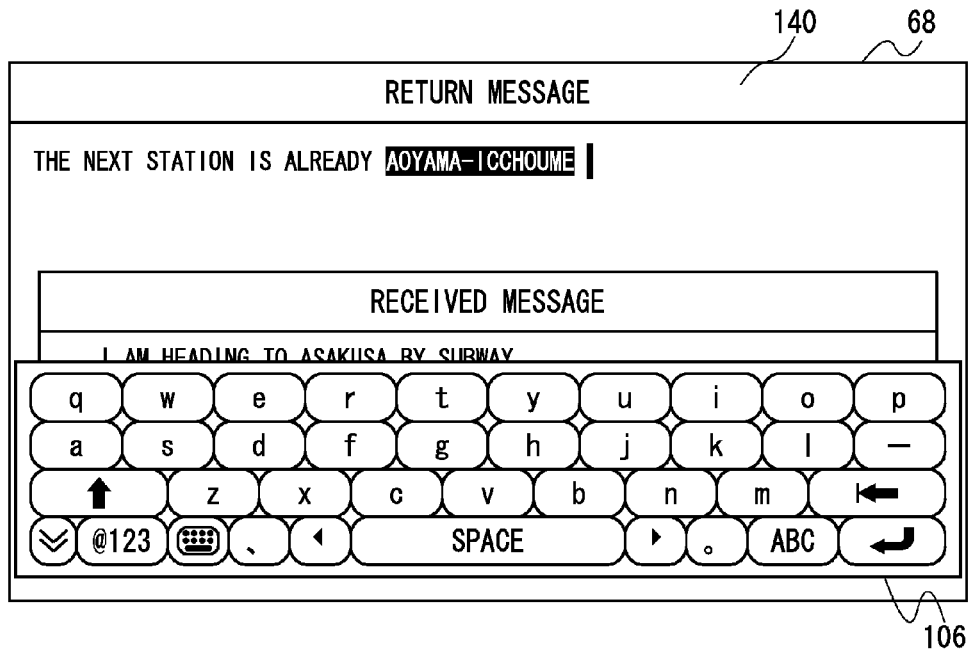
FIG. 22 shows an image for illustrating a display control function for an on-screen keyboard screen and an application screen.
Figure 23:
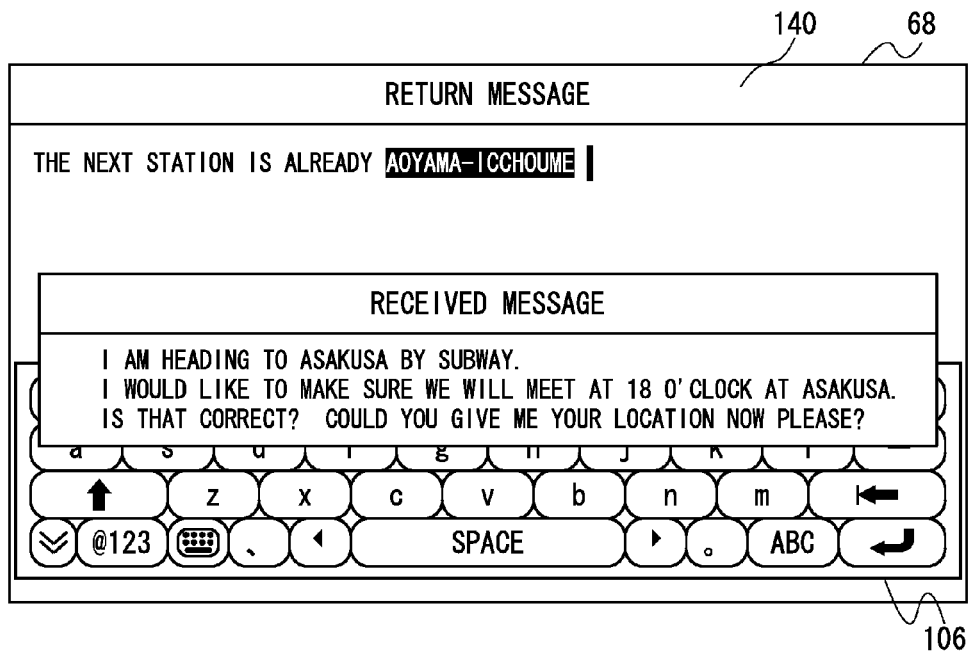
FIG. 23 shows an image for illustrating a display control function for an on-screen keyboard screen and an application screen.

FIGS. 22 and 23 show images for illustrating a display control function for an on-screen keyboard screen and an application screen. As shown in FIG. 22, if it is required to input characters, symbols, numbers, or the like while the application 42 is running, the keyboard display unit 82 displays the on-screen keyboard 106 so that the on-screen keyboard 106 is superimposed on the screen 140 of the application. Upon receiving an operation input from the rear touch panel 70 while the on-screen keyboard 106 is being displayed, the screen control unit 88 lowers the priority of displaying the on-screen keyboard 106, which has been displayed on the screen 140, to a level lower than that of the screen 140 of the application. For example, the on-screen keyboard 106 may be displayed under the screen 140 of the application as shown in FIG. 23. Alternatively, the transparency factor of the on-screen keyboard 106 may be raised so that the screen 140 displayed under the transparent on-screen keyboard 106 can be seen through. The screen control unit 88 may determine the transparency factor of the on-screen keyboard 106 in accordance with contact duration time, contact pressure, or the like when a thumb or a finger of a user, or the like contacts the rear touch panel 70. For example, the screen control unit 88 may determine the transparency factor of the on-screen keyboard 106, so that the longer or the stronger the touch on the rear touch panel 70 is, the higher the transparency factor of the on-screen keyboard 106 is. This allows a user to view a portion of a screen that is covered by the on-screen keyboard 106 when the user inputs characters or the like by using the on-screen keyboard 106. Therefore, a limited area of the screen can be used effectively, and user friendliness can be improved. By adopting a visual expression where the screen 140 of the application, which has been displayed under the on-screen keyboard 106, appears as if it floats if a user touches the rear touch panel 70, a user interface that can be understood intuitively can be provided. Alternatively, a user interface that can be understood intuitively may be provided by adopting a visual expression where the on-screen keyboard 106, which has been displayed on the screen 140 of the application, appears as if it sinks to a level below the screen 140 of the application if a finger or a thumb of a user that has contacted the rear touch panel 70 detaches from the rear touch panel 70. Alternatively, whether or not to display an on-screen keyboard may be switched by tapping the rear touch panel 70 twice quickly.

Upon receiving a flick operation on the rear touch panel 70, the application 42 may scroll the screen 140 of the application. If the screen control unit 88 has not received an operation input on the rear touch panel 70 for a predetermined time period or longer, the screen control unit 88 displays the on-screen keyboard 106, which has been displayed under the screen 140, again on the screen 140. Consequently, displaying of a screen can be controlled so that the screen 140 of an application can be seen only during a period when a user wants to see it. Therefore, user friendliness can be improved.

Figure 24:
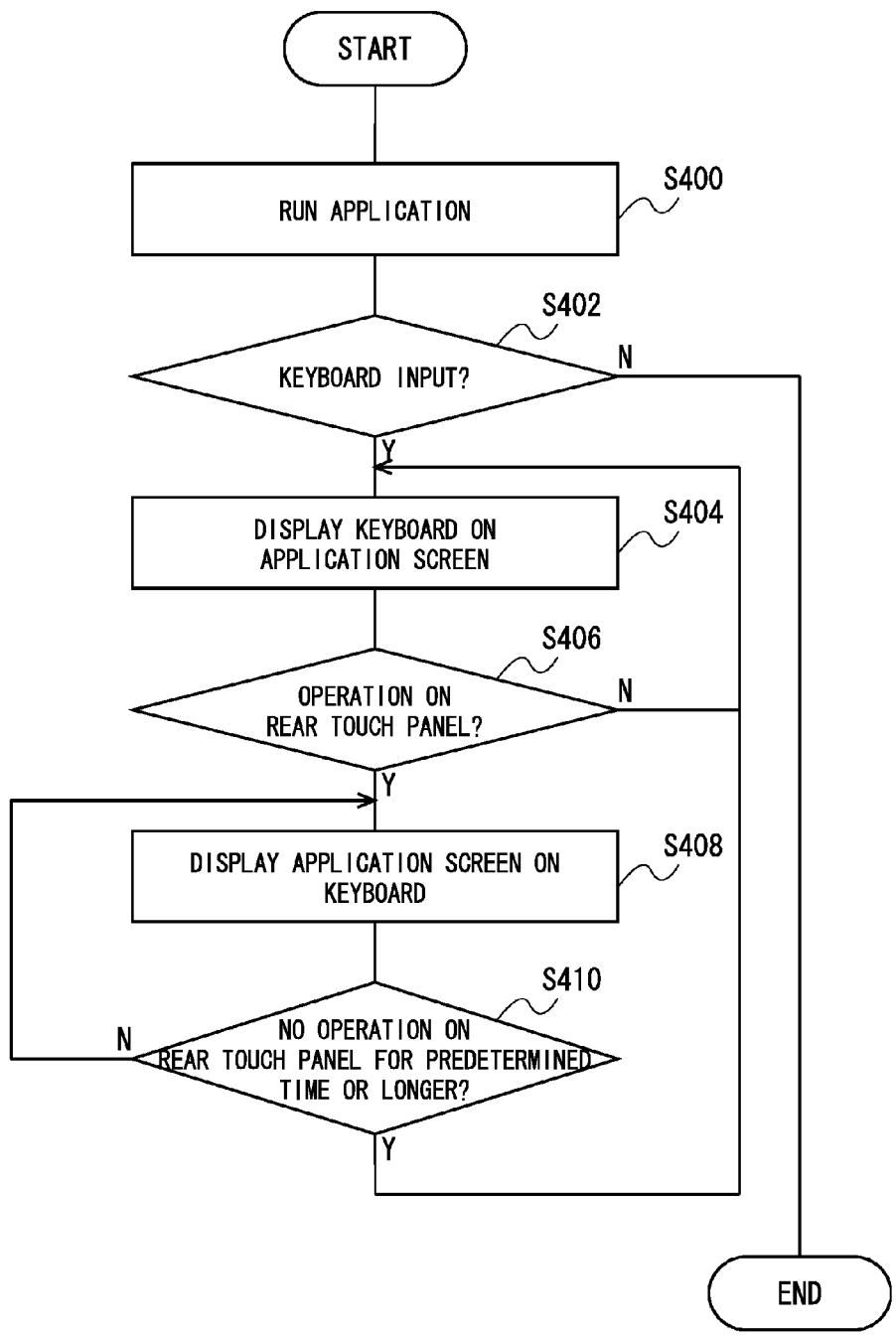
FIG. 24 shows a flowchart indicating a procedure of a display control function for an on-screen keyboard screen and an application screen.

FIG. 24 shows a flowchart indicating a procedure of a display control function for an on-screen keyboard screen and an application screen. If input through an on-screen keyboard is required (Y in S402) while an application is running (S400), the keyboard display unit 82 displays an on-screen keyboard so that the on-screen keyboard is superimposed on the screen of the application (S404). Upon receiving an operation input on the rear touch panel 70 (Y in S406), the screen control unit 88 displays the screen of the application on the on-screen keyboard (S408). If an operation input on the rear touch panel 70 is not received for a predetermined time period or longer (Y in S410), the procedure returns to the step S404 and the on-screen keyboard, which has been displayed under the screen of the application, is displayed on the screen of the application again. If input through the on-screen keyboard is not performed (N in S402), the following steps will be skipped. If an operation input on the rear touch panel 70 is not received in step S406 (N in S406), the procedure returns to step S404. If a predetermined time period has not yet passed after the operation input from the rear touch panel 70 is ceased in step S410 (N in S410), the procedure returns to the step S408.

Although in the exemplary embodiment described above, a description on a display control function for an on-screen keyboard screen and an application screen has been given, a control target according to the present invention is not limited to an on-screen keyboard screen and an application screen. For example, a plurality of on-screen keyboards corresponding to different types of character set or symbol set (e.g., an on-screen keyboard screen for entering Japanese and an on-screen keyboard screen for entering English) may be set as control targets. In this case, on-screen keyboards may preferably be scaled down and displayed as described in the exemplary embodiment in paragraphs 0030-0035. More specifically, a keyboard image that is displayed upper on the display screen may preferably be scaled down and displayed, and a keyboard image that is displayed lower on the display screen may preferably be displayed in a bigger size than that of the front keyboard image. The keyboard display unit 82 changes the priorities for displaying the plurality of types of on-screen keyboard screens in accordance with an operation input from the rear touch panel 70. For example, each time a touch input is received from the rear touch panel 70, the keyboard display unit 82 may shift the priorities for displaying on-screen keyboard screens forward by one, respectively, and may change a priority of displaying an on-screen keyboard that had the highest priority of displaying to the lowest. In this process, the input receiving unit 81 receives a character or a symbol that is selected by a user from among a plurality of characters or symbols displayed on the on-screen keyboard having the highest priority of displaying. Consequently, a plurality of on-screen keyboards can be switched easily. Alternatively, a plurality of application screens may be set as targets for controlling according to the present invention.

As described above, the invention disclosed in the exemplary embodiment is characterized by changing the displaying priority, which a candidate screen image to be displayed has, on the basis of a predetermined operation input from a touch panel provided on the rear face of a mobile terminal. As examples of changing the displaying priority, presented are: changing the front/back on a display screen; changing the transparency factor; and changing whether or not to display according to the exemplary embodiment. However, the invention is not limited to these examples but any method that changes visual recognition levels of a user can be adopted.

Given above is an explanation based on the exemplary embodiments. These embodiments are intended to be illustrative only and it will be obvious to those skilled in the art that various modifications to constituting elements and processes could be developed and that such modifications are also within the scope of the present invention.

What is claimed is:

1. An input device comprising: a storage unit configured to store a plurality of keyboard screens each corresponding to a set of a plurality of characters or symbols, each keyboard screen being designed to show the set of the plurality of characters or symbols that can be input on a screen and to receive a user's selection of a character or a symbol;

a display unit configured to read one of the plurality of keyboard screens from the storage unit and to display the read keyboard screen on the screen;
an input receiving unit configured to receive the selection of the character or the symbol selected by the user from among the plurality of characters or symbols; and
a switching control unit configured to cause, when a first user control input to switch the keyboard screen is received while the display unit is showing one of the plurality of keyboard screens on the screen and while the input receiving unit receives selection of the character or the symbol from the plurality of characters or symbols included in the keyboard screen displayed on the screen, the input device to make a transition to a switching mode to switch the keyboard screen, to read the plurality of keyboard screens including the keyboard screen displayed on the screen from the storage unit, and to display the read keyboard screens on the screen as selection candidates, the switching control unit being further configured to switch the selection candidate being selected from among the plurality of keyboard screens, when a second user control input to switch the selection candidate of the keyboard screen is received in the switching mode,
wherein, when the switching control unit receives a third user control input to confirm the candidate being selected by the user in the switching mode, the display unit displays the keyboard screen selected as the candidate on the screen, and the input receiving unit receives the character or the symbol selected by the user from among the plurality of characters or symbols included in the displayed keyboard screen,
wherein at least one of the plurality of keyboard screens has a basic screen for entering the character and a sub-screen for entering the symbol or a numeral, and
wherein the switching control unit prohibits the switching mode while the sub-screen is being displayed.

2. The input device according to claim 1, wherein the switching control unit displays a row or column of a plurality of reduced images produced by reducing the plurality of keyboard screens on the display, and, when a flick operation on the row or column is received as the second user control input, the switching control unit switches the candidate being selected by scrolling the plurality of reduced images.

3. The input device according to claim 2, wherein the switching control unit receives an operation of tapping one of the keyboard screens displayed on the screen as the third user control input.

4. The input device according to claim 1, wherein the switching control unit receives an operation of causing the keyboard screen to appear to be pressed as the first user control input and causes the input device to make the transition to the switching mode, creating visual effects of causing the keyboard screen to appear to be temporarily pressed down.

5. The input device according to claim 2, wherein the switching control unit receives an operation of causing the keyboard screen to appear to be pressed as the first user control input and causes the input device to make the transition to the switching mode, creating visual effects of causing the keyboard screen to appear to be temporarily pressed down.

6. The input device according to claim 3, wherein the switching control unit receives the operation of causing the keyboard screen to appear to be pressed as the first user control input and causes the input device to make the transition to the switching mode, creating visual effects of causing the keyboard screen to appear to be temporarily pressed down.

7. The input device according to claim 1, wherein the switching control unit receives an operation of causing the keyboard screen to appear to be pressed as the first user control input and causes the input device to make the transition to the switching mode, creating visual effects of causing the keyboard screen to appear to be temporarily pressed down.

8. The input device according to claim 4, wherein the operation of causing the keyboard screen to appear to be pressed is a press-and-hold operation at a predetermined position on a touch panel provided on the screen.

9. The input device according to claim 1, wherein the switching control unit receives an operation of causing the keyboard screen to appear to float as the first user control input, and causes the input device to make the transition to the switching mode, creating visual effects of causing the keyboard screen to appear to float temporarily.

10. The input device according to claim 2, wherein the switching control unit receives an operation of causing the keyboard screen to appear to float as the first user control input, and causes the input device to make the transition to the switching mode, creating visual effects of causing the keyboard screen to appear to float temporarily.

11. The input device according to claim 3, wherein the switching control unit receives the operation of causing the keyboard screen to appear to float as the first user control input, and causes the input device to make the transition to the switching mode, creating visual effects of causing the keyboard screen to appear to float temporarily.

12. The input device according to claim 9, wherein the operation of causing the keyboard screen to appear to float is a tap operation or a press-and-hold operation at a predetermined position on a touch panel provided on a rear face opposite to the screen.

13. An input method comprising: reading, from a storage unit configured to store a plurality of keyboard screens each corresponding to a set of a plurality of characters or symbols, one of the plurality of keyboard screens and displaying the read keyboard screen on a screen, each keyboard screen being designed to show the set of the plurality of characters or symbols that can be input on the screen and to receive a user's selection of a character or a symbol,
receiving the selection of the character or the symbol selected by the user from among the plurality of characters or symbols; causing, when a first user control input to switch the keyboard screen is received while showing one of the plurality of keyboard screens on the screen and while receiving selection of the character or the symbol from the plurality of characters or symbols included in the keyboard screen displayed on the screen, an input device to make a transition to a switching mode to switch the keyboard screen;
reading the plurality of keyboard screens including the keyboard screen displayed on the screen from the storage unit;
displaying the read keyboard screens on the screen as selection candidates;
switching the selection candidate being selected from among the plurality of keyboard screens, when a second user control input to switch the selection candidate of the keyboard screen is received in the switching mode; and
displaying, when a third user control input to confirm the candidate being selected by the user is received in the switching mode, the keyboard screen selected as the candidate on the screen, and receiving the character or the symbol selected by the user from among the plurality of characters or symbols included in the displayed keyboard screen, wherein at least one of the plurality of keyboard screens has a basic screen for entering the character and a sub-screen for entering the symbol or a numeral, and wherein the switching mode is prohibited while the sub-screen is being displayed.

14. A non-transitory computer-readable recording medium having embedded thereon a computer program, comprising:

a display module configured to read, from a storage unit configured to store a plurality of keyboard screens each corresponding to a set of a plurality of characters or symbols, one of the plurality of keyboard screens and to display the read keyboard screen on a screen, each keyboard screen being designed to show the set of the plurality of characters or symbols that can be input on the screen and to receive a user's selection of a character or a symbol, a receiving module configured to receive the selection of the character or the symbol selected by the user from among the plurality of characters or symbols; and a switching module configured to cause, when a first user control input to switch the keyboard screen is received while the display module is showing one of the plurality of keyboard screens on the screen and while the receiving module receives selection of the character or the symbol from the plurality of characters or symbols included in the keyboard screen displayed on the screen, an input device to make a transition to a switching mode to switch the keyboard screen, to read the plurality of keyboard screens including the keyboard screen displayed on the screen from the storage unit, and to display the read keyboard screens on the screen as selection candidates, the switching module being further configured to switch the selection candidate being selected from among the plurality of keyboard screens, when a second user control input to switch the selection candidate of the keyboard screen is received in the switching mode, wherein, when the switching module receives a third user control input to confirm the candidate being selected by the user in the switching mode, the display module displays the keyboard screen selected as the candidate on the screen, and the receiving module receives the character or the symbol selected by the user from among the plurality of characters or symbols included in the displayed keyboard screen, wherein at least one of the plurality of keyboard screens has a basic screen for entering the character and a sub-screen for entering the symbol or a numeral, and wherein the switching module prohibits the switching mode while the sub-screen is being displayed.

* * * * *